United States Patent
Yoon (10) Patent No.: US 8,754,608 B2
(45) Date of Patent: Jun. 17, 2014

(54) SYSTEM AND METHOD FOR CHARGING ELECTRONIC DEVICE BY COMMUNICATING WITH AND MOVING THE ELECTRONIC DEVICE

(75) Inventor: Jin Ho Yoon, Incheon (KR)

(73) Assignee: Pantech Co., Ltd., Seoul (KR)

( * ) Notice: Subject to any disclaimer, the term of this patent is extended or adjusted under 35 U.S.C. 154(b) by 320 days.

(21) Appl. No.: 13/229,034

(22) Filed: Sep. 9, 2011

(65) Prior Publication Data

US 2012/0200254 A1   Aug. 9, 2012

(30) Foreign Application Priority Data

Feb. 7, 2011   (KR) .................. 10-2011-0010557

(51) Int. Cl.
*H01M 10/46*   (2006.01)

(52) U.S. Cl.
USPC ....................................................... 320/108

(58) Field of Classification Search
USPC .................. 320/107, 108, 112, 114
See application file for complete search history.

(56) References Cited

U.S. PATENT DOCUMENTS

2011/0074344 A1*   3/2011   Park et al. ..................... 320/108

FOREIGN PATENT DOCUMENTS

| JP | 2010-279240 | 12/2010 |
| KR | 10-2010-0074595 | 7/2010 |

* cited by examiner

*Primary Examiner* — Edward Tso
(74) *Attorney, Agent, or Firm* — H.C. Park & Associates, PLC (57) ABSTRACT

Provided are a system and a method for inductive charging of an electronic device, including: a charging pad including a first coil which generates a magnetic field when power is applied; and an electronic device which includes a second coil and charges a battery using an induced current induced in the second coil as the first coil generates the magnetic field, wherein the charging pad performs data communication with the electronic device and moves the electronic device so that the maximum charging value is induced in the second coil. Data communication between the charging pad and the electronic device is fed back in real time, so that the electronic device can be disposed at a position where optimal charging efficiency can be exhibited.

20 Claims, 7 Drawing Sheets

FIG. 1

Related Art

FIG. 2

Related Art

SYSTEM AND METHOD FOR CHARGING ELECTRONIC DEVICE BY COMMUNICATING WITH AND MOVING THE ELECTRONIC DEVICE

CROSS-REFERENCE TO RELATED APPLICATION

This application claims priority to and the benefit under 35 U.S.C. §119(a) of Korean Patent Application No. 10-2011-0010557, filed on Feb. 7, 2011, which is incorporated by reference for all purposes as if fully set forth herein.

BACKGROUND

1. Field

The following description relates to a system and method for charging an electronic device, and more particularly, to a system and a method for inductive charging of an electronic device, capable of moving an electronic device into a position at which optimal charging efficiency is improved, by data communication between a charging pad and the electronic device in real time.

2. Discussion of the Background

The market trend for recent non-contact or inductive chargers follows the Wireless Power Consortium (WPC) standard. This standard is for charging various types of terminals (WPC-compatible products) with a single inductive charging pad having a primary coil (hereinafter, referred to as a charging pad). In particular, the standard requires a gap between coils of 2.5 mm. There are various terminal housings with varying dimensions that may be charged by a charging pad.

Figure 1:
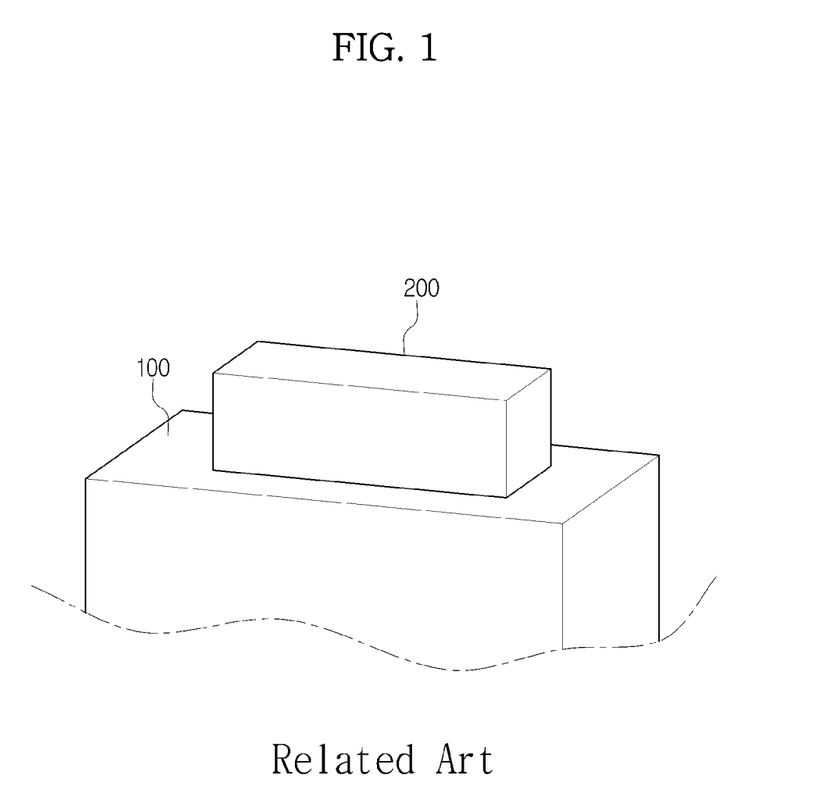
FIG. 1 is a perspective view of an inductive charging system according to the related art.
Figure 2:
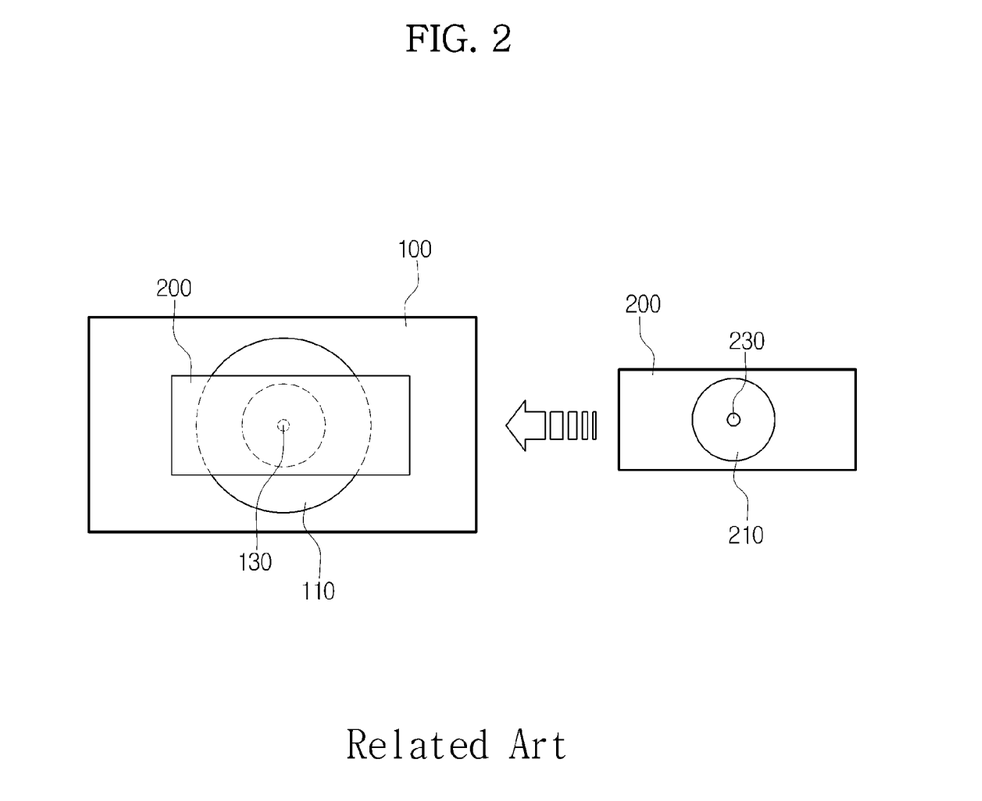
FIG. 2 is a top view of an inductive charging system according to the related art.

FIG. 1 is a perspective view of an inductive charging system of an electronic device according to the related art. FIG. 2 is a top view of an inductive charging system of an electronic device according to the related art. Referring to FIG. 1, the inductive charging system of an electronic device according to the related art includes a charging pad 100 and an electronic device 200 positioned on the charging pad. Inductive charging systems have two important parameters, efficiency and recognition rate. The related art utilizes permanent magnets inserted into the charging pad 100 and the electronic device 200 to guide the electronic device 200 into position, to achieve the maximum efficiency and solve the recognition rate problem.

Referring to FIG. 2, a first coil 110 is included in the charging pad 100 to generate a magnetic field when powered on, and a second coil 210 is included in the electronic device 200 so that the second coil 210 generates an induced current as the magnetic field is generated. The induced current generated charges a battery (not shown) included in the electronic device. In order to maximize efficiency during charging, the positions of the center portions of the first coil 130 and the second coil 230 may be aligned. In order to align the center point, the inductive charging system according to the related art is implemented so that permanent magnets are installed in both the charging pad 100 and the electronic device 200, or a permanent magnet is installed in the charging pad 100 and metal is installed in the electronic device to guide the electronic device into position by a magnetic force when the electronic device approaches the charging pad.

The permanent magnets may cause various side effects in a mobile terminal, for example, malfunction of a geomagnetic sensor or Hall IC and RF performance degradation. Even if metal is used in the mobile terminal rather than a permanent magnet, a significant improvement in minimization of side effects is not made due to the influence of magnetization.

SUMMARY

Exemplary embodiments of the present invention provide a system and a method for charging an electronic device, and more particularly, a system and method for inductive charging capable of reducing malfunctions in a geomagnetic sensor, a Hall IC, or the like.

Additional features of the invention will be set forth in the description which follows, and in part will be apparent from the description, or may be learned by practice of the invention.

An exemplary embodiment of the present invention discloses a inductive charging system for an electronic device, including: a charging pad having a first coil to generate a magnetic field if power is applied to the first coil; and an electronic device having a second coil and to charge a battery of the electronic device using an induced current induced in the second coil from the magnetic field generated by the first coil generates the magnetic field, wherein the charging pad performs data communication with the electronic device and moves the electronic device so a the maximum charging value of the electronic device is induced in the second coil.

An exemplary embodiment of the present invention also discloses an inductive charging method of an electronic device, the method including: applying power to a first coil in a charging pad; detecting, a current induced in a second coil in an electronic device from the first coil through data communication with the electronic device; comparing the detected induced current with a maximum charging value of the electronic device; and if the induced current in the second coil is lower than the maximum charging value moving the electronic device so that the maximum charging value is induced in the second coil.

An exemplary embodiment of the present invention also discloses a charging pad, including a data communication unit to receive and transmit a maximum charging value and an induced current; a comparison unit to receive the maximum charging value and the induced current and to compare the maximum charging value to the induced current; a movement unit to move; and a motor driving unit to drive the movement unit if the induced current is less than the maximum charging value.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the drawings, like reference numerals denote like elements. The shape, size and regions, and the like, of the drawing may be exaggerated for clarity. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc., does not denote a limitation of quantity, but rather denotes the presence of at least one of the referenced item. The use of the terms "first," "second," and the like does not imply any particular order, but they are included to identify individual elements. Moreover, the use of the terms first, second, etc., does not denote any order or importance, but rather the terms first, second, etc., are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "horizontally," "vertically," "right," "left," "upwards," "downwards," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "right" of other elements or features would then be oriented to the "left" of the other elements or features. Thus, the exemplary term "right" can encompass both an orientation of right and left. The device may be otherwise oriented (rotated 90 degrees or at other orientations) and the spatially relative descriptors used herein interpreted accordingly. It will be understood that when an element or layer is referred to as being "on" or "connected to" another element or layer, it can be directly on or directly connected to the other element or layer, or intervening elements or layers may be present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 3:
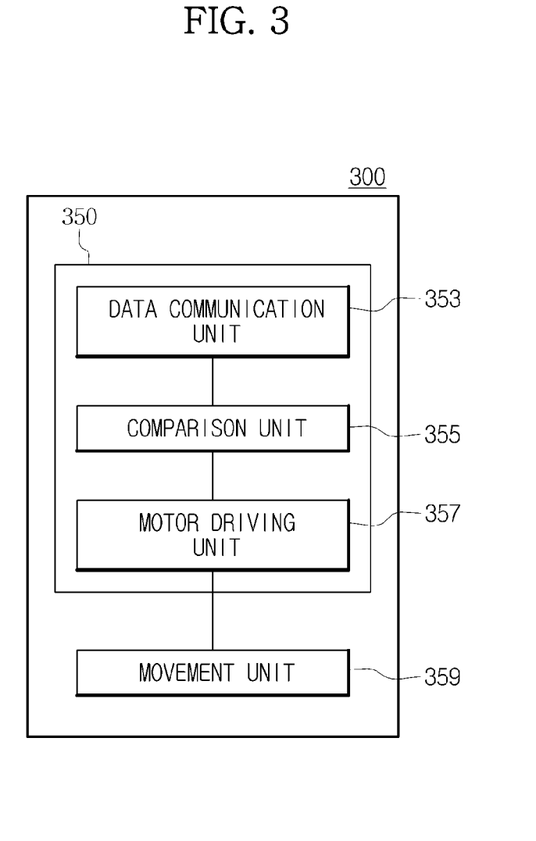
FIG. 3 is a block diagram of a charging pad according to an exemplary embodiment.

FIG. 3 is a block diagram of a charging pad according to an exemplary embodiment. Aspects of the present invention provide a charging pad to perform data communication with an electronic device and move the electronic device to induce an increased or maximum charge value, which refers to the maximum charging current, in a second coil of the electronic device. Data received through data communication includes information regarding an induced current induced in a secondary coil. Data communication may be conducted through any suitable wired and/or wireless method including Bluetooth®, Wifi®, 3G®, 4G®, etc. The charging pad 300 includes a control unit 350 to drive a motor if the induced current is lower than the maximum charging current of the electronic device and a movement unit 359, which is mechanically connected to a motor, to move the electronic device.

The control unit 350 includes a data communication unit 353, a comparison unit 355, and a motor driving unit 357. The data communication unit 353 performs data communication with the electronic device in real time to detect the current induced in the secondary coil, which is included in the data. The comparison unit 355 is connected to the data communication unit 353 and compares the induced current detected by the data communication unit 353 with the maximum charging current of the electronic device. The maximum charging current refers to a current that can be applied to the secondary coil of the electronic device to achieve the maximum efficiency charging for the electronic device. The maximum charging current may vary depending on the voltage level to which a battery is charged. For example, in a battery charged up to 4.2 V at the maximum, the magnitude of the maximum current that can be used to charge the battery is determined based on the current voltage in the battery. The motor driving unit 357 is connected to the comparison unit 355 and drives a motor (not shown) if the comparison unit 355 determines that the induced current is lower than the maximum charging current. The movement unit 359 is a device connected to the motor and directly exerts physical forces to move the electronic device placed on the charging pad 300.

Figure 4:
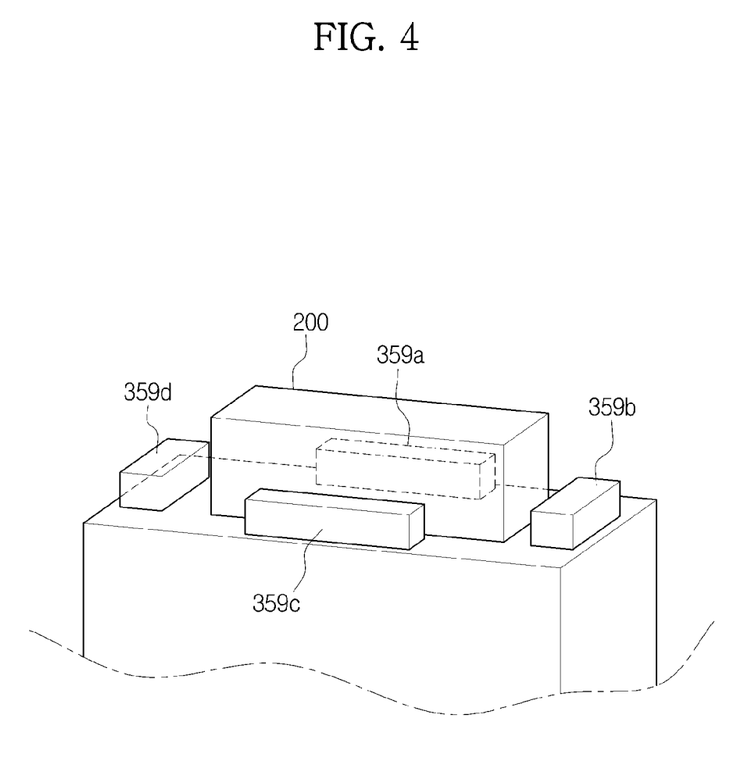
FIG. 4 is a perspective view of an inductive charging system according to an exemplary embodiment.

FIG. 4 is a perspective view of an inductive charging system according to an exemplary embodiment. Referring to FIG. 4, the movement unit 359*a*, movement unit 359*b*, movement unit 359*c*, and movement unit 359*d* together are respectively disposed at sides of the electronic device 200 positioned on the charging pad 300. Although, four hexahedron movement units are depicted in FIG. 4, aspects of the present invention are not limited thereto, and the number and shape of movement units may vary depending on design requirements. Further, the movement unit 359*a*, movement unit 359*b*, movement unit 359*c*, and movement unit 359*d* may at least partially or completely surround the electronic device 200 disposed on the charging pad 300. The movement unit 359*a*, movement unit 359*b*, movement unit 359*c*, and movement unit 359*d* are able to move in a straight line as described in detail as follows.

Figure 5:
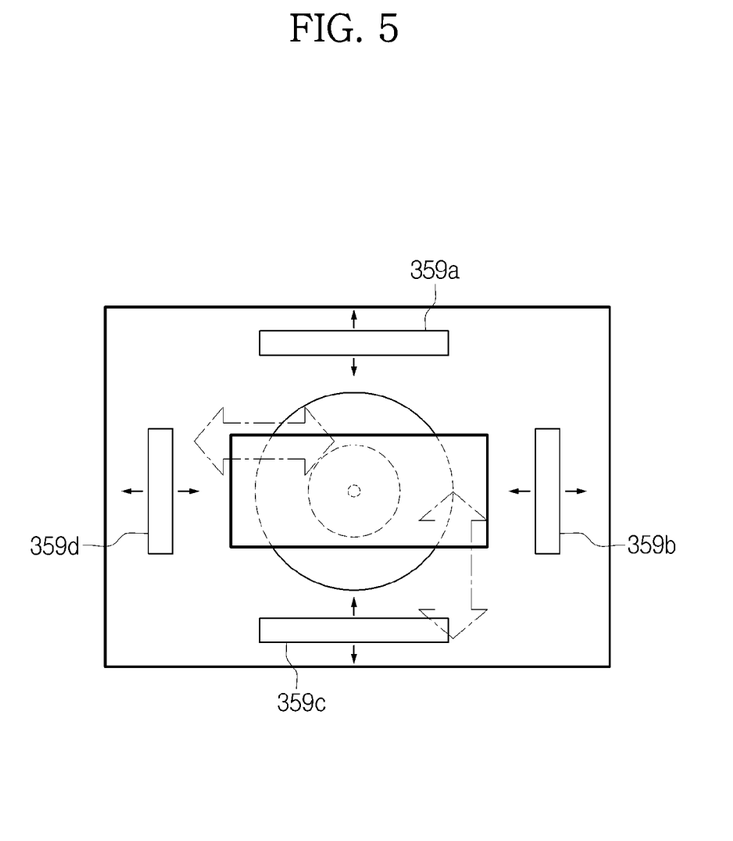
FIG. 5 is a top view of an inductive charging system according to an exemplary embodiment.

FIG. 5 is a top view of an inductive charging system according to an exemplary embodiment. Referring to FIG. 5, the movement units 359 include horizontal movement units 359*b* and 359*d* and vertical movement units 359*a* and 359*c*. Here, horizontality and verticality are relative directions, and the horizontal movement units 359*b* and 359*d* and the vertical movement units 359*a* and 359*c* may be exchanged depending on the viewpoint. The horizontal movement units 359*b* and 359*d* are moved to move the electronic device 200 horizontally. For example, in order to move the electronic device 200 to the left, the movement unit 359b moves straight to the left to push and move the electronic device 200 to the left. In order to move the electronic device 200 to the right, the movement unit 359d moves straight to the right to push and move the electronic device 200 to the right. In the same manner, the electronic device 200 is moved vertically downward by using the movement unit 359a, and the electronic device 200 is moved vertically upward by using the movement unit 359c. The movement unit 359a, movement unit 359b, movement unit 359c, and movement unit 359d are each driven by a motor, and are able to move depending on the driving direction of the corresponding motor. Therefore, the movement units 359a, movement unit 359b, movement unit 359c, and movement unit 359d are moved by the motor driving unit 357 that drives the motor, and as a result, the position of the electronic device 200 is changed.

If the motor driving unit 357 determines a direction in which to move the electronic device 200, position information regarding a part of the charging pad 300 on which the electronic device 200 is positioned is not needed. The motor driving unit 357 may perform data communication with the electronic device 200 in real time and may dispose the electronic device 200 at the optimal position for charging, by comparing whether the induced current induced in the secondary coil, which is included in the data, is lower than the maximum charging current and whether the induced current after movement is increased or decreased compared with the induced current before the movement.

The comparison unit 355 compares the induced current currently induced in the secondary coil with the maximum charging current, and as a result, if the induced current is lower than the maximum charging current, the motor driving unit 357 drives a horizontal motor (may also drive a vertical motor) to allow the horizontal movement unit 359d connected to the horizontal motor to move the electronic device to the right. Thereafter, the induced current after the movement to the right is detected by the data communication unit 353 which performs communication in real time, and the comparison unit 355 compares the induced current before the movement to the right with the induced current after the movement to the right. If the induced current after the movement to the right is higher than the induced current before the movement to the right, in other words, if the induced current is increased, the motor driving unit 357 maintains a driving direction of the motor. If an increase rate of the induced current becomes 0, the motor driving unit 357 suspends the driving direction of the motor. In other words, by using data communication performed in real time, the induced current immediately after the electronic device 200 is moved is fed back to the charging pad 300, and is compared with the induced current before the movement of the electronic device 200. The comparison of the induced current is used to maintain the driving direction of the motor until the induced current fails to increase more. If the induced current after the movement of the electronic device 200 is lower than the induced current before the movement of the electronic device 200, in other words, if the induced current is reduced, the motor driving unit reverses the driving direction of the motor. Thereafter, as described above, driving of the motor is suspended if the increase rate of the induced current becomes 0. As such, the electronic device 200 may be disposed at the most efficient charging position on the horizontal axis of the charging pad 300, i.e., at a position where a current which is the closest equivalent to the maximum charging current in the horizontal axis is induced in the electronic device. Similarly, if the electronic device is disposed at a position where a current which is the closest equivalent to the maximum charging current in the vertical axis is induced, the result that the electronic device is disposed at the most efficient charging position on the plane may be obtained. A method of moving the electronic device to the position where the current is which is the closest equivalent to the maximum charging current in the vertical axis is induced is the same as the movement method in the horizontal axis described above, so that detailed description thereof will be omitted.

Figure 6:
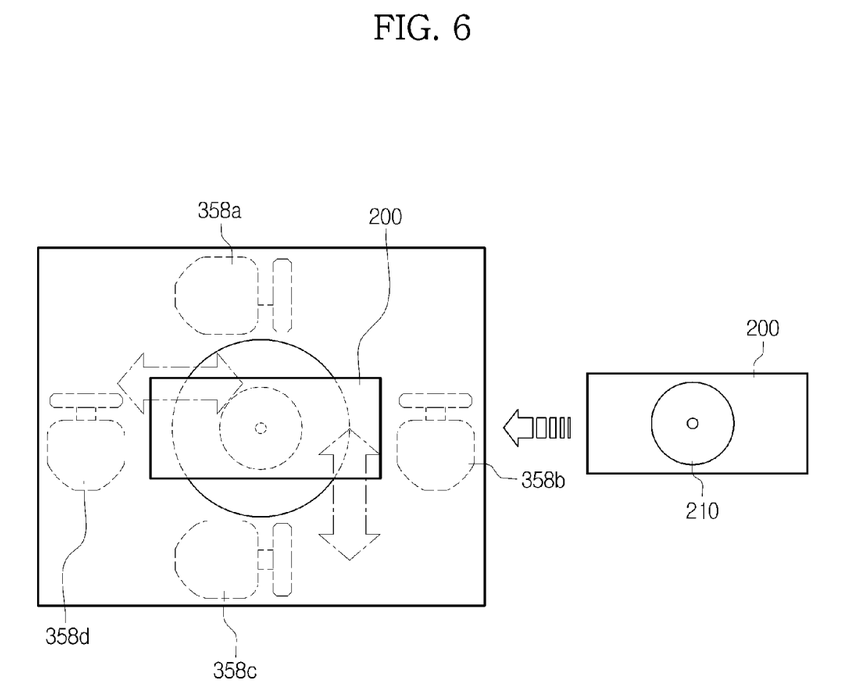
FIG. 6 is a top view of an inductive charging system according to an exemplary embodiment.

FIG. 6 is a top view of an inductive charging system according to an exemplary embodiment. Referring to FIG. 6 a vibration motor is used as the motor to move the electronic device 200. The vibration motor transfers vibrations generated by the motor to a part of the surface of the charging pad 300 to move the electronic device 200 positioned on the surface of the charging pad. The movement units are formed between the vibration motor and the surface of the charging pad 300 and operate to transfer the vibrations of the motor 358a, motor 358b, motor 358c, and motor 358d to the surface of the charging pad 300. Therefore, the movement units do not protrude from the surface of charging pad 300 nor do the movement units individually move. If the vibration motor is driven and the vibration is transferred to the surface of the charging pad 300, the direction in which the electronic device moves may be constant. In order to move the electronic device horizontally and/or vertically, horizontal motor 358b, horizontal motor 358d, vertical motor 358a, and vertical motor 358c are disposed in charging pad 300. If the horizontal motor 358b is vibrated, the electronic device is able to move along the horizontal axis, and the direction is dependent on a rotation direction of the horizontal vibration motor 358b. As such, by using the horizontal vibration motor 358b and horizontal motor 358d and the vertical vibration motor 358a and vertical motor 358c, the electronic device 200 may be disposed at the position where the maximum charging current is induced. The induced current may not be the maximum induced current but may be an increase in the induced current, or an induced current near the maximum induced current. The principle of disposing the electronic device at an optimal position by the data commendation except for the movement method is the same as that described with reference to FIG. 5.

Figure 7:
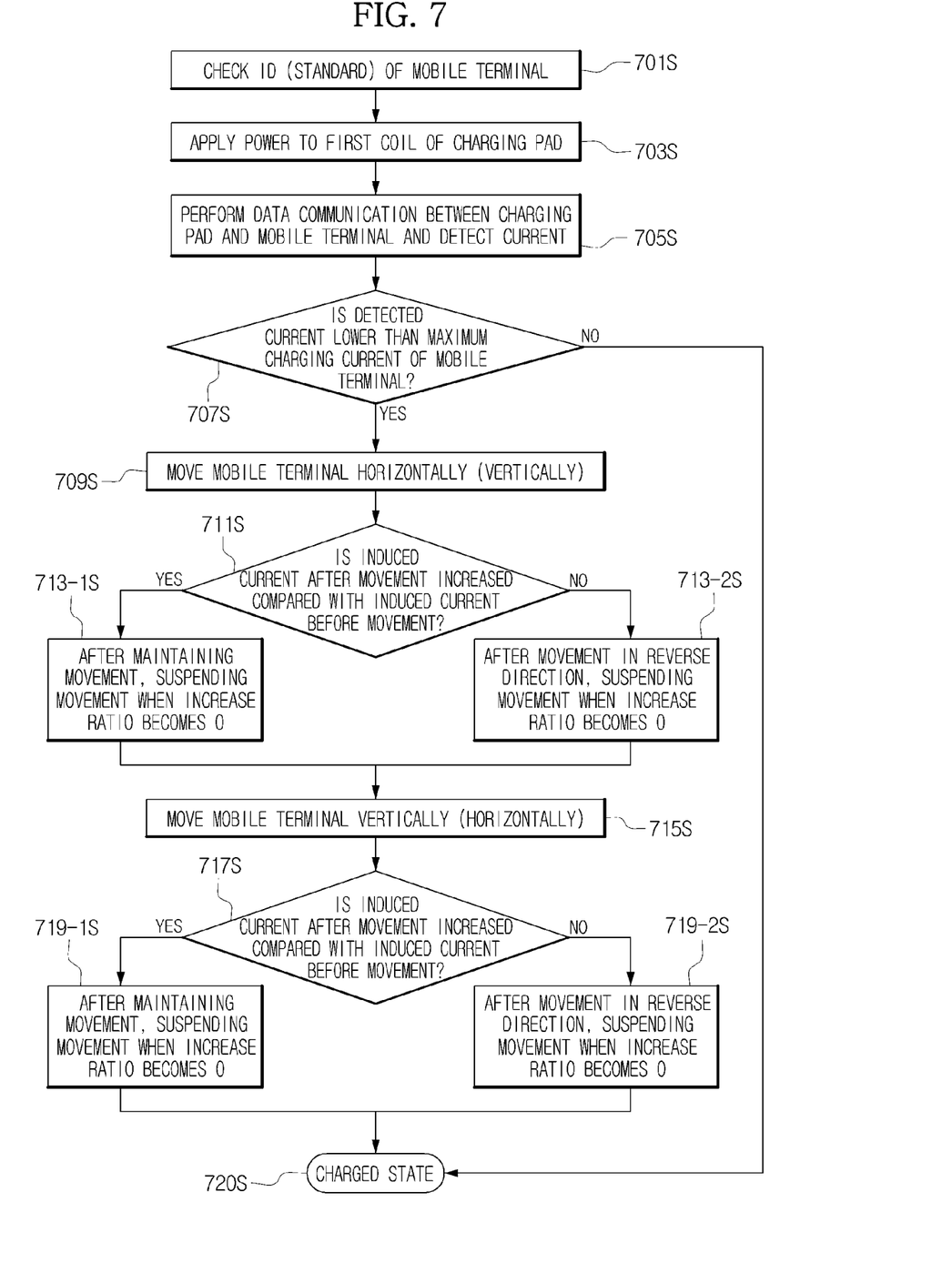
FIG. 7 is a flowchart of a method for inductive charging according to an exemplary embodiment.

FIG. 7 is a flowchart of an inductive charging method according to an exemplary embodiment. Referring to FIG. 7, in operation 701S, the charging pad checks an ID of the electronic device. The ID of the electronic device refers to the standard of the electronic device, and is used to restrict charging if the charging pad has a capacity outside of the charging range that is allowed by the electronic device. If the ID is checked and it is determined that the electronic device has a suitable standard, power is applied to the first coil of the charging pad in operation 703S. In operation 705S, the charging pad begins data communication with the electronic device. The communicated data includes information regarding the induced current induced in the secondary coil, and as described above, the data communication unit of the charging pad performs data communication and detects the induced current of the second coil. In operation 707S, the control unit determines whether the detected current is lower than the maximum charging current of the electronic device. If the induced current is the maximum charging current, the charged state of the electronic device is maintained at the current position. If the induced current is lower than the maximum charging current, the electronic device is moved horizontally (or vertically) in operation 709S. The electronic device may be moved by a physical movement of a movement unit or propagation of vibrations by a vibration motor. The horizontal movement may be arbitrarily chosen to be towards the left or the right. In operation 711S, the comparison unit determines whether the induced current after the horizontal movement is increased compared with the induced current before the horizontal movement. In operation 713-1S, if the induced current after the horizontal movement is increased compared with the induced current before the horizontal movement, the electronic device is moved until the increase rate becomes 0. In operation 713-2S, if the induced current after the horizontal movement is decreased compared with the induced current before the horizontal movement, the electronic device is moved in the reverse direction and the movement is maintained until the increase rate of the induced current becomes 0. After the electronic device is disposed at the optimal position in the horizontal axis, a process of disposing the electronic device at the optimal position in the vertical axis is performed. In operation 715S the electronic terminal may be moved in an arbitrarily chosen vertical direction. The comparison unit determines whether the induced current after the vertical movement is increased compared with the induced current before vertical movement in operation 717S. In operation 719-1S, if the induced current after the vertical movement is increased compared with the induced current before the vertical movement, the electronic device is moved until the increase rate becomes 0. In operation 719-2S, if the induced current after the vertical movement is reduced compared with the induced current before the vertical movement, the electronic device is moved in the reverse direction, and the movement is maintained until the increase rate of the induced current becomes 0. As a result, the electronic device is disposed at the position where the electronic device may be charged with the maximum efficiency on the charging pad. In operation 720S, charging may be maintained at the optimal position. Although not shown in FIG. 7, the movement in the horizontal and/or vertical directions may be repeated and/or performed simultaneously.

According to the exemplary embodiments, by using data communication an electronic device can be automatically disposed at a position where the maximum charging efficiency can be exhibited without the use of permanent magnets and failure or damage due to magnetization may be prevented.

According to the present disclosure, permanent magnets which have been used according to the related art are not used to position the electronic device on the charging plate, so that failures or errors that may occur in a terminal may be decreased. Data communication between the charging pad and the electronic device is fed back in real time, so that the electronic device can be disposed at a position where optimal charging efficiency can be exhibited.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. An inductive charging system for an electronic device, the system comprising:
   a charging pad having a first coil to generate a magnetic field if power is applied to the first coil; and
   an electronic device having a second coil to charge a battery of the electronic device using an induced current induced in the second coil from the magnetic field generated by the first coil,
   wherein the charging pad performs data communication with the electronic device and moves the electronic device so that a maximum charging value of the electronic device is induced in the second coil.

2. The inductive charging system according to claim 1, wherein data communication with the electronic device comprises transmitting data to and/or receiving data from the electronic device.

3. The inductive charging system according to claim 2, wherein the charging pad determines the maximum charging value of the electronic device through the data communication with the electronic device.

4. The inductive charging system according to claim 1, wherein the data includes information regarding the induced current, and the charging pad comprises:
   a control unit to drive a motor if the induced current is lower than the maximum charging value of the electronic device; and
   a movement unit connected to the motor to move the electronic device.

5. The inductive charging system according to claim 4, wherein the control unit comprises:
   a data communication unit to perform the data communication and to detect the induced current;
   a comparison unit to compare the induced current in the second coil with the maximum charging value of the electronic device; and
   a motor driving unit to drive the motor if the detected induced current in the second coil is lower than the maximum charging value of the electronic device.

6. The inductive charging system according to claim 5, further comprising:
   four movement units disposed on the charging pad at respective sides of the electronic device positioned on the charging pad,
   wherein each of the movement units is moveable by the motor.

7. The inductive charging system according to claim 5, wherein the motor driving unit drives the motor to move the movement unit to move the electronic device if the induced current in the second coil is lower than the maximum charging value of the electronic device.

8. The inductive charging system according to claim 5, wherein
   the motor is a vibration motor and is embedded in the charging pad, and
   the movement unit is formed between the vibration motor and the surface of the charging pad to transfer vibrations from the vibration motor to the surface of the charging pad.

9. The inductive charging system according to claim 8, wherein the motor driving unit drives the vibration motor to move the movement unit to move the electronic device if the induced current in the second coil is lower than the maximum charging value of the electronic device.

10. The inductive charging system according to claim 7, wherein the motor driving unit suspends driving of the motor if an increase rate of the induced current in the second coil is 0.

11. The inductive charging system according to claim 9, wherein the motor driving unit suspends driving of the motor if an increase rate of the induced current in the second coil is 0.

12. The inductive charging system according to claim 1, wherein the maximum charging value varies depending on a voltage level of the battery of the electronic device.

13. An inductive charging method of an electronic device, the method comprising:
- applying power to a first coil in a charging pad;
- detecting a current induced in a second coil in an electronic device from the first coil through data communication with the electronic device;
- comparing the detected induced current with a maximum charging value of the electronic device; and
- if the induced current in the second coil is lower than the maximum charging value, moving, by the charging pad, the electronic device so that the maximum charging value is induced in the second coil.

14. The inductive charging method according to claim 13, wherein the maximum charging value varies depending on a battery voltage of the electronic device.

15. The inductive charging method according to claim 13, wherein the moving of the electronic device comprises:
- moving the electronic device horizontally and suspending the horizontal movement of the electronic device at a position which is closest to the maximum charging value; and
- moving the electronic device vertically and suspending the vertical movement of the electronic device at a position which is closest to the maximum charging value.

16. The inductive charging method according to claim 15, wherein the moving of the electronic device horizontally comprises:
- if the induced current in the second coil after the horizontal movement is increased compared to the induced current in the second coil before the horizontal movement, suspending the electronic device at a position where an increase ratio of the induced current in the second coil is 0, and
- if the induced current in the second coil after the horizontal movement is reduced compared to the induced current in the second coil before the horizontal movement, moving the electronic device horizontally in the reverse direction and suspending the movement at a position where the increase rate of the induced current in the second coil is 0.

17. The inductive charging method according to claim 15, wherein the moving of the electronic device vertically comprises:
- if the induced current in the second coil after the vertical movement is increased compared to the induced current in the second coil before the vertical movement, suspending the electronic device at a position where an increase ratio of the induced current is 0, and
- if the induced current in the second coil after the vertical movement is reduced compared to the induced current in the second coil before the vertical movement, moving the electronic device vertically in the reverse direction and suspending the movement at a position where the increase rate of the induced current is 0.

18. A charging pad, comprising:
- a data communication unit to receive and transmit a maximum charging value and an induced current;
- a comparison unit to receive the maximum charging value and the induced current and to compare the maximum charging value to the induced current;
- a movement unit; and
- a motor driving unit to drive the movement unit if the induced current is less than the maximum charging value.

19. The charging pad of claim 18, wherein the movement unit is disposed on a surface of the charging pad and moves an electronic device on the surface of the charging pad.

20. The charging pad of claim 18, wherein the motor driving unit drives a vibration motor and the movement unit transfers the vibrations from the motor to the surface of the charging pad.

* * * * *